United States Patent
Ortega

(10) Patent No.: US 6,263,375 B1
(45) Date of Patent: Jul. 17, 2001

(54) METHOD FOR CREATING DICTATION MACROS

(75) Inventor: Kerry A. Ortega, Deerfield Beach, FL (US)

(73) Assignee: International Business Machines Corp., Armonk, NY (US)

(*) Notice: Subject to any disclaimer, the term of this patent is extended or adjusted under 35 U.S.C. 154(b) by 0 days.

(21) Appl. No.: 09/143,767

(22) Filed: Aug. 31, 1998

(51) Int. Cl.⁷ .................................................. G10L 21/00
(52) U.S. Cl. ............................................ 709/275; 704/270
(58) Field of Search ............................................. 704/275

(56) References Cited

U.S. PATENT DOCUMENTS

| | | | | |
|---|---|---|---|---|
| 5,632,002 | * | 5/1997 | Hashimoto et al. | 704/256 |
| 5,835,571 | * | 11/1998 | Johnson | 379/67 |
| 5,873,064 | * | 2/1999 | De Armas et al. | 704/275 |
| 5,920,841 | * | 6/1999 | Schottmuller et al. | 704/275 |
| 5,999,933 | * | 12/1999 | Mehta | 707/100 |
| 6,078,327 | * | 6/2000 | Liman et al. | 345/357 |
| 6,101,473 | * | 8/2000 | Scott et al. | 704/275 |

* cited by examiner

*Primary Examiner*—Fan Tsang
*Assistant Examiner*—Michael N. Opsasnick
(74) *Attorney, Agent, or Firm*—Akerman Senterfitt

(57) ABSTRACT

A method for creating dictation macros includes a series of steps including storing selected text from a text string and displaying a graphical user interface (GUI) for naming a dictation macro responsive to a first user command. The GUI can have a section for naming the macro. The step of creating a baseform for a macro name entered into the section of the GUI responsive to a second user command can be included. Also, the method can include associating the macro name with the stored selected text from the text string as a dictation macro. A method for creating dictation macros in a speech application also can include creating text and selecting the text. The method can include invoking a first user command for the speech application to create a dictation macro and naming the dictation macro. The step of invoking a second user command for the speech application to create a baseform for the macro name and associate the macro name with the selected text as the dictation macro also can be included.

11 Claims, 2 Drawing Sheets

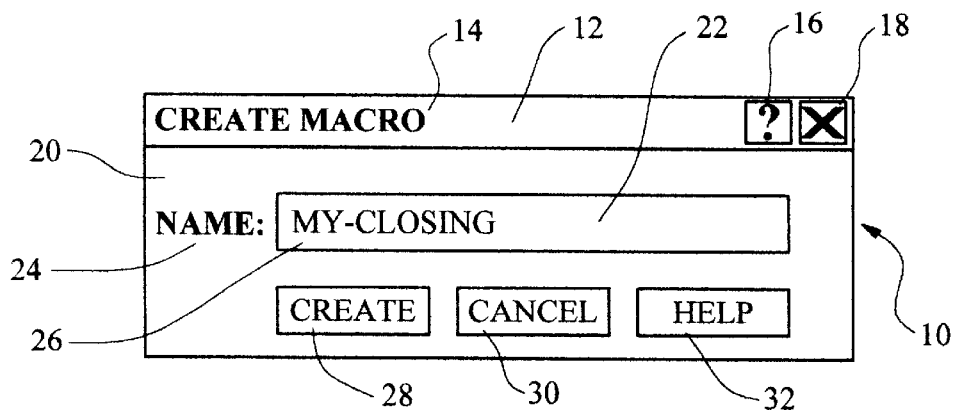
FIG. 1
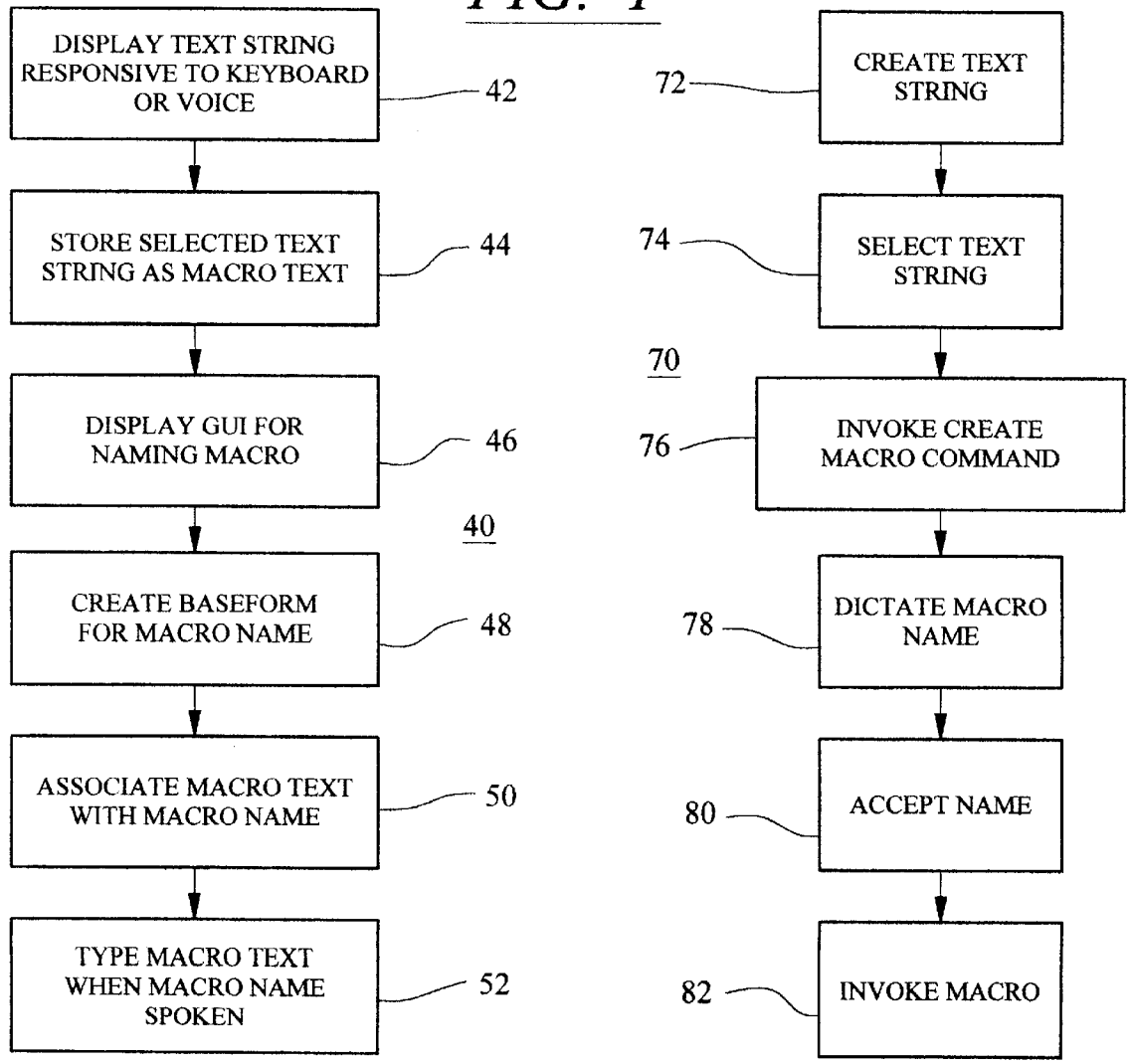
FIG. 2
FIG. 3

| Dictation Macro Editor | | | |
|---|---|---|---|
| File Edit View Pronunciation Help | | | |
| NAME | VOCABULARY | TYPE | DESCRIPTION |
| - | ALL | MACRO | PRONOUNCED DASH |
| ! | ALL | MACRO | PRONOUNCED EXCLAMATION-POINT |
| # | ALL | MACRO | PRONOUNCED NUMBER-SIGN |
| $ | ALL | MACRO | PRONOUNCED DOLLAR-SIGN |
| % | ALL | MACRO | PRONOUNCED PERCENT-SIGN |
| ( | ALL | MACRO | PRONOUNCED OPEN-PARENTHESIS |
| ) | ALL | MACRO | PRONOUNCED CLOSE-PARENTHESIS |
| , | ALL | MACRO | PRONOUNCED COMMA |
| . | ALL | MACRO | PRONOUNCED PERIOD |
| / | ALL | MACRO | PRONOUNCED SLASH |
| : | ALL | MACRO | PRONOUNCED COLON |
| ; | ALL | MACRO | PRONOUNCED SEMI-COLON |
| ? | ALL | MACRO | PRONOUNCED QUESTION-MARK |

SPEECH PARAMETERS
USER NAME: KERRY      VOCABULARY: CONTINUOUS GENERAL DICTATION

Create Macro

MACRO
- CASE SENSITIVE NAME: My-Closing
- DESCRIPTION:
- VOCABULARY: ⦿ ALL   ◯ CONTINUOUS GENERAL DICTATION

MACRO TEXT

Here is the place I must type my macro text:

I could do a closing like:

Yours Truly,

Kerry

INSERT
[ DATE/TIME ]  [ PICK LINK... ]  [ MACRO ]

[ SAVE ]  [ APPLY ]  [ CANCEL ]  [ OPTIONS... ]  [ HELP ]

*FIG. 5*

METHOD FOR CREATING DICTATION MACROS

BACKGROUND OF THE INVENTION

1. Field of the Invention

The invention relates to the field of speech applications, and in particular, to a greatly simplified method for creating dictation macros.

2. Description of Related Art

One of the most important features of a dictation system is the ability to create dictation macros. Dictation macros allow the user to create blocks of text that are used over and over again. For example, users might want to create macros for their E-mail addresses or land addresses. Using dictation macros can speed up repetitive dictation. However, creating dictation macros has typically not been very easy.

In today's speech systems a user must go to a dictation macro utility to create a dictation macro. A graphical user interface (GUI) screen like that shown in FIG. 4 is displayed to the user. The list includes the definition of every dictation macro in the speech application's recognition engine. The screen also includes five pull down menus. The user then chooses Create Macro from the Edit menu and the dialog box shown in FIG. 5 is displayed. The dialog box shown in FIG. 5 must be used to create the kind of definition shown in FIG. 4. It can be seen that, in addition to a macro text typing field and a macro name typing field, two Vocabulary categories, namely All and Continuous General Dictation, as well as eight activatable button icons must be mastered. Several of the button icons invoke further dialogs or functions.

A novice user can find such a utility to be very intimidating. There is a long felt need for a simpler method to create dictation macros.

SUMMARY OF THE INVENTION

In accordance with the inventive arrangements, the steps needed to crate a dictation macro are greatly simplified. In the presently preferred embodiment, the user merely types or dictates the text exactly how he or she would like to see the text in the application. The user then selects the text and issues a voice command like Create Macro, or selects a similarly named menu item. The system then presents the user with a graphical user interface in the form of a simplified dialog box requiring only the entry of a name for the macro and activation of a button icon to complete the process.

Text to speech can be used to generate the initial baseform for the macro name. Thereafter, when the user dictates the macro name, the text appears exactly as the text that was selected.

A method for creating dictation macros, in accordance with an inventive arrangement, comprises the steps of: storing a selected text string; displaying a graphical user interface (GUI) for naming a dictation macro responsive to a first user command, said GUI having a section for naming said macro; creating a baseform for a macro name entered into said section of said GUI responsive to a second user command; and, associating said macro name with said stored selected text string as a said dictation macro.

The method can further comprise the step of typing said stored selected text when said macro name is spoken.

The displaying step can include providing said GUI with an activatable icon for invoking said second user command.

The method can further comprise the steps of speaking said first and second user commands.

The method can further comprise the step of first dictating said stored selected text string.

A method for creating dictation macros in a speech application, in accordance with another inventive arrangement, comprises the steps of: creating a text string; selecting said text string; invoking a first user command for said speech application to create a dictation macro; naming said dictation macro; and, invoking a second user command for said speech application to create a baseform for said macro name and associate said macro name with said selected text string as said dictation macro.

The method can further comprise the step of having said speech application type said selected text by speaking said macro name.

The method can further comprise the steps of speaking said first and second user commands.

The creating step can comprise dictating words into said speech application.

BRIEF DESCRIPTION OF THE DRAWINGS

FIG. 1 is a graphical user interface in accordance with the inventive arrangements.

FIG. 2 is a flow chart useful for explaining the inventive arrangements with regard to the method followed by the speech application in creating a dictation macro.

FIG. 3 is a flow chart useful for explaining the inventive arrangements with regard to the method followed by a user in creating a dictation macro.

FIG. 4 is a prior art display screen for a Dictation Macro Utility.

FIG. 5 is a prior art screen displayed when invoking a Create Macro command form the Edit menu in the display screen of FIG. 4.

DETAILED DESCRIPTION OF THE PREFERRED EMBODIMENTS

A simplified graphical user interface (GUI) 10 in accordance with the inventive arrangements is shown in FIG. 1. It should be appreciated that no special GUI or display screen is necessary for entering the macro text. Only a few steps are necessary. The first step is to select the text during dictation or correction sessions of the speech application. If the text is not available, the text can be dictated and selected during dictation or correction sessions of the speech application. The second step is to invoke a first user command to name the dictation macro. The third step is to enter the name on a GUI display, such as that shown in FIG. 1. The final step is to invoke a second user command which associates the selected text with the name and creates the dictation macro. The user commands are most easily invoked by voice commands.

The simplified GUI 10 includes first and second sections 12 and 14. The first section 12 has the name 14 of the macro utility as well as a help button icon 16 and a close window button icon 18. The second section 20 has a mini-window 22 for entering the name of the dictation macro, by dictation or typing. Section 20 also includes a name 24 for the mini-window 22 as well button icons 28, 30 and 32. Button icon is used to create the dictation macro, that is, to associate the name in mini-window 22 with the selected text, and to store the combination as a dictation macro. Alternatively, the create command can be invoked by voice. Button 30 cancels the macro creation routine and button 32 summons a help screen. The name 26 in the mini-window, "MY-CLOSING", is appropriate for the closing portion of a letter.

The method as implemented by the speech application is illustrated by flow chart 40 in FIG. 2. The first step in accordance with block 42 is to display a text string responsive to a keyboard or voice dictation. Thereafter, some or all of the text as selected by the user is stored as possible dictation macro text in accordance with the step of block 44. The use of the selected text is not certain until the user invokes a command to create a dictation macro, in which case a GUI such as GUI 10 is displayed in accordance with the step of block 46. In response to user entry of a macro name in the GUI, and in response to a user command to create the dictation, the speech application creates a baseform for the name in accordance with the step of block 48. The user command can be invoked by activation of an icon or by voice. Once the baseform for the name is established, the macro name and the macro text can be associated with one another as the desired dictation macro in accordance with the step of block 50. Thereafter, in any subsequent dictation session, the macro text will be typed whenever the macro name is spoken, in accordance with the step of block 52. The arrow leading to block 52 is dashed to acknowledge that invoking the macro is not part of the method for creating the macro.

The method from the point of view of the user is illustrated by flow chart 70 in FIG. 3. A text string is created in accordance with the step of block 72, by typing or by dictation. Some or all of the text string is selected in accordance with the step of block 74. The create macro command is invoked in accordance with the step of block 76, most easily by voice command. The name of the dictation macro is typed into a section of a GUI, for example GUI 10 shown in FIG. 1, generated by the speech application in accordance with the step of block 78. The name is accepted or approved in accordance with the step of block 80, by activation of an icon or by voice command, in response to which the speech application associates the macro name with the macro text and stores the combination as the desired dictation macro. Thereafter, in any subsequent dictation session, the macro text will be typed whenever the macro name is spoken, in accordance with the step of block 82. The arrow leading to block 82 is dashed to acknowledge that invoking the macro is not part of the method for creating the macro.

In its simplest form, and as compared to the prior art, users need only type or dictate the text, just like the users want the text to appear in the application, and then the users just select the text and name the macro.

What is claimed is:

1. A method for creating dictation macros, comprising the steps of:

storing selected text from a text string;

displaying a graphical user interface (GUI) for naming a dictation macro responsive to a first user command, said GUI having a section for naming said macro;

entering into said section of said GUI a macro name for said selected text;

responsive to a second user command creating a baseform for said macro name; and, associating said macro name with said stored selected text from said text string as said dictation macro.

2. The method of claim 1, further comprising the step of typing said stored selected text when said macro name is spoken.

3. The method of claim 1, wherein said displaying step includes providing said GUI with an activatable icon for invoking said second user command.

4. The method of claim 1, comprising the steps of speaking said first and second user commands.

5. The method of claim 1, comprising the step of first dictating said stored selected text.

6. The method of claim 5, comprising the steps of speaking said first and second user commands.

7. A method for creating dictation macros in a speech application, comprising the steps of:

creating a text string;

selecting text from said text string;

invoking a first user command for said speech application to create a dictation macro;

naming said dictation macro; and, invoking a second user command for said speech application to create a baseform for said macro name and to associate said macro name with said selected text string as said dictation macro.

8. The method of claim 1, further comprising the step of having said speech application type said selected text by speaking said macro name.

9. The method of claim 7, comprising the steps of speaking said first and second user commands.

10. The method of claim 9, wherein said creating step comprises dictating words into said speech application.

11. The method of claim 7, wherein said creating step comprises dictating words into said speech application.

* * * * *